US012665219B2

(12) United States Patent
Shimizu et al.

(10) Patent No.: US 12,665,219 B2
(45) Date of Patent: Jun. 23, 2026

(54) ALL-SOLID-STATE BATTERY AND BATTERY MODULE

(71) Applicant: HONDA MOTOR CO., LTD., Tokyo (JP)

(72) Inventors: Ryo Shimizu, Wako (JP); Takuya Taniuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 612 days.

(21) Appl. No.: 18/112,932

(22) Filed: Feb. 22, 2023

(65) Prior Publication Data

US 2023/0307698 A1 Sep. 28, 2023

(30) Foreign Application Priority Data

Mar. 24, 2022 (JP) ................................. 2022-048399

(51) Int. Cl.
| | |
|---|---|
| *H01M 10/056* | (2010.01) |
| *H01M 10/0562* | (2010.01) |
| *H01M 10/6561* | (2014.01) |
| *H01M 50/198* | (2021.01) |

(Continued)

(52) U.S. Cl.
CPC ... H01M 10/0562 (2013.01); H01M 10/6561 (2015.04); H01M 50/198 (2021.01); H01M 50/3425 (2021.01); H01M 50/358 (2021.01); H01M 2300/0068 (2013.01)

(58) Field of Classification Search
CPC ......... H01M 10/0562; H01M 10/0561; H01M 10/056; H01M 10/6561; H01M 10/6566; H01M 50/198; H01M 50/3425; H01M 50/358; H01M 2300/0068
See application file for complete search history.

(56) References Cited

U.S. PATENT DOCUMENTS

| | | | |
|---|---|---|---|
| 2021/0119250 A1* | 4/2021 | Taniuchi | ........... H01M 10/0525 |
| 2022/0069344 A1* | 3/2022 | Sasaki | ................. H01M 50/129 |
| 2022/0328911 A1* | 10/2022 | Imamoto | ................ B32B 27/08 |

FOREIGN PATENT DOCUMENTS

| | | |
|---|---|---|
| JP | 2005-116235 A | 4/2005 |
| JP | 2008-103245 A | 5/2008 |
| JP | 2011-124084 A | 6/2011 |

OTHER PUBLICATIONS

Office Action dated Sep. 16, 2025, issued in counterpart JP Application No. 2022-048399, with English translation.(6 pages).

\* cited by examiner

*Primary Examiner* — Raymond Alejandro

(74) *Attorney, Agent, or Firm* — WHDA, LLP

(57) ABSTRACT

An all-solid-state battery includes a laminated body in which a positive electrode layer, a sulfide-based solid electrolyte layer, and a negative electrode layer are laminated; an absorber configured to absorb hydrogen sulfide gas; and an outer package configured to form a housing space in which the laminated body and the absorber are housed. The outer package includes a sealing portion configured to hermetically seal the housing space. The sealing portion includes a fragile portion whose sealing strength is weaker than that of the other portion of the sealing portion. In a case where the hydrogen sulfide gas is generated in the housing space, sealing of the fragile portion is released earlier than the other portion to form a discharge port through which the hydrogen sulfide gas is discharged to an outside of the housing space.

13 Claims, 7 Drawing Sheets

(51) Int. Cl.
    *H01M 50/342*     (2021.01)
    *H01M 50/358*     (2021.01)

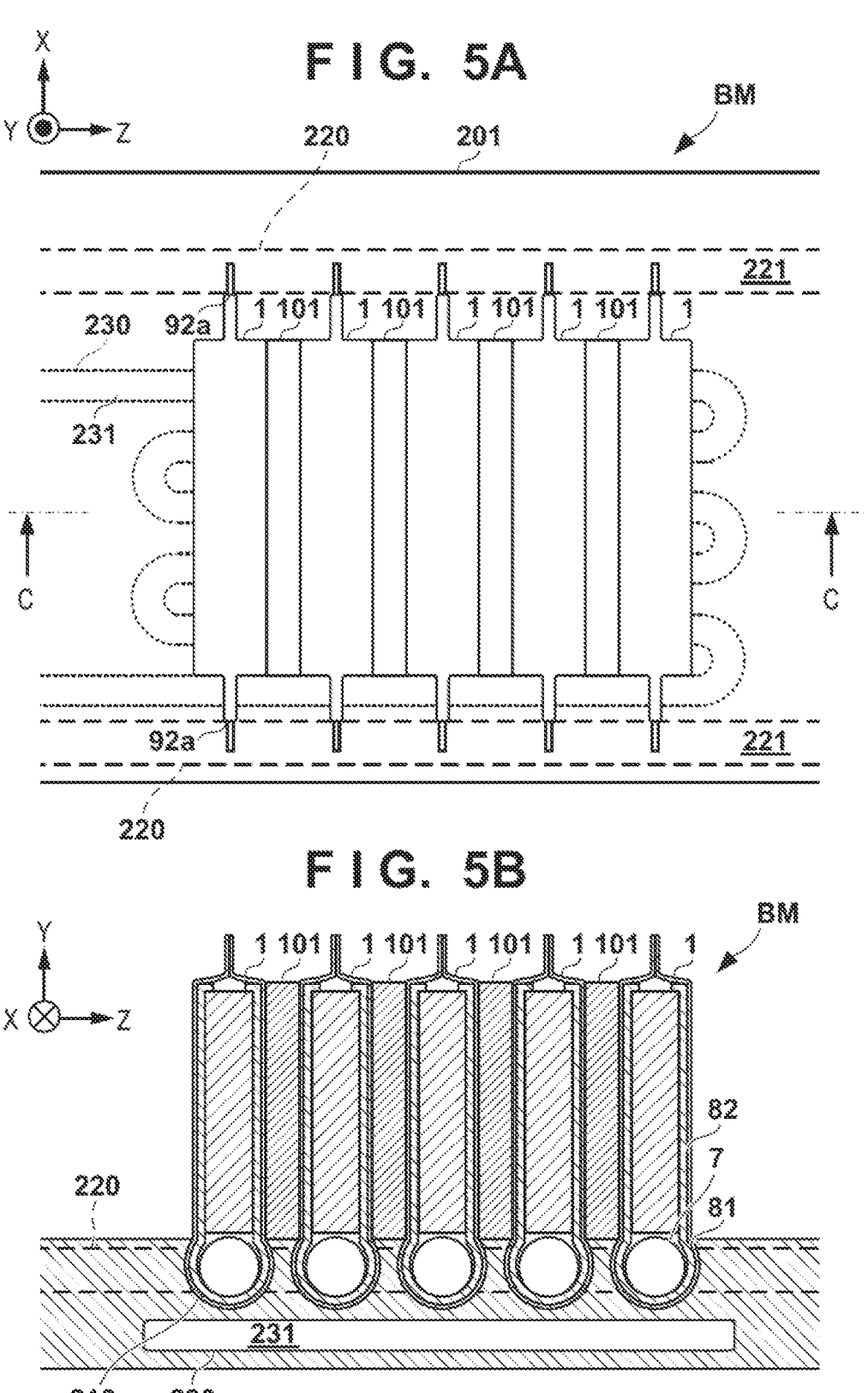
F I G. 5A
F I G. 5B

F I G. 7A
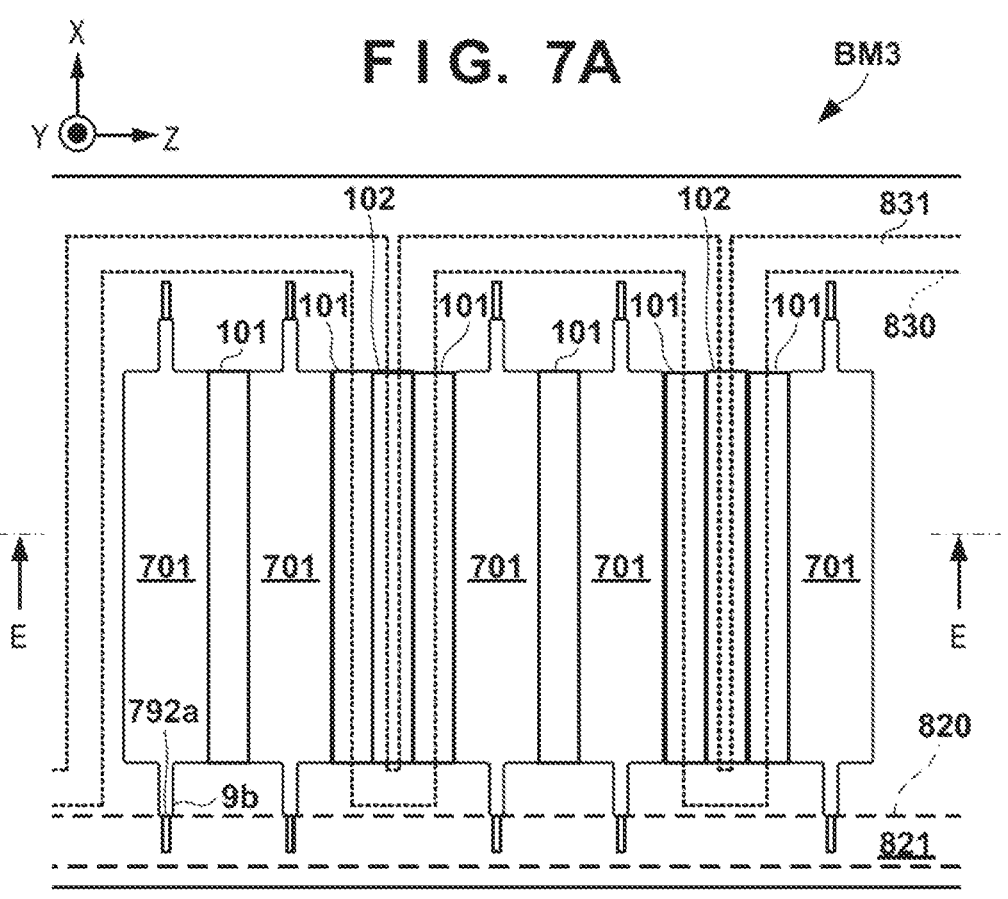
F I G. 7B
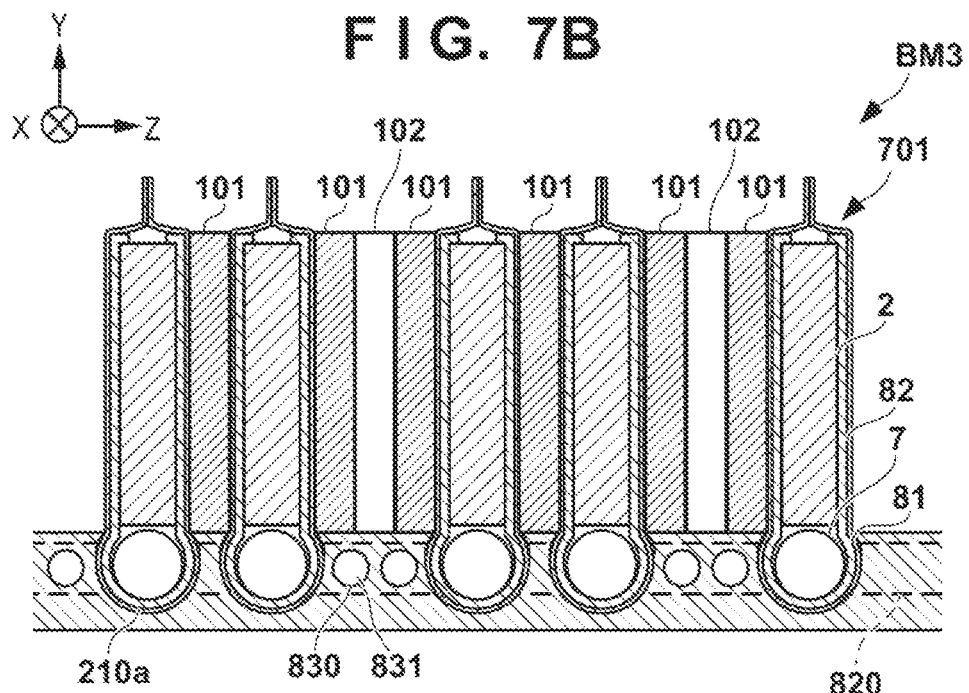

F I G. 8A
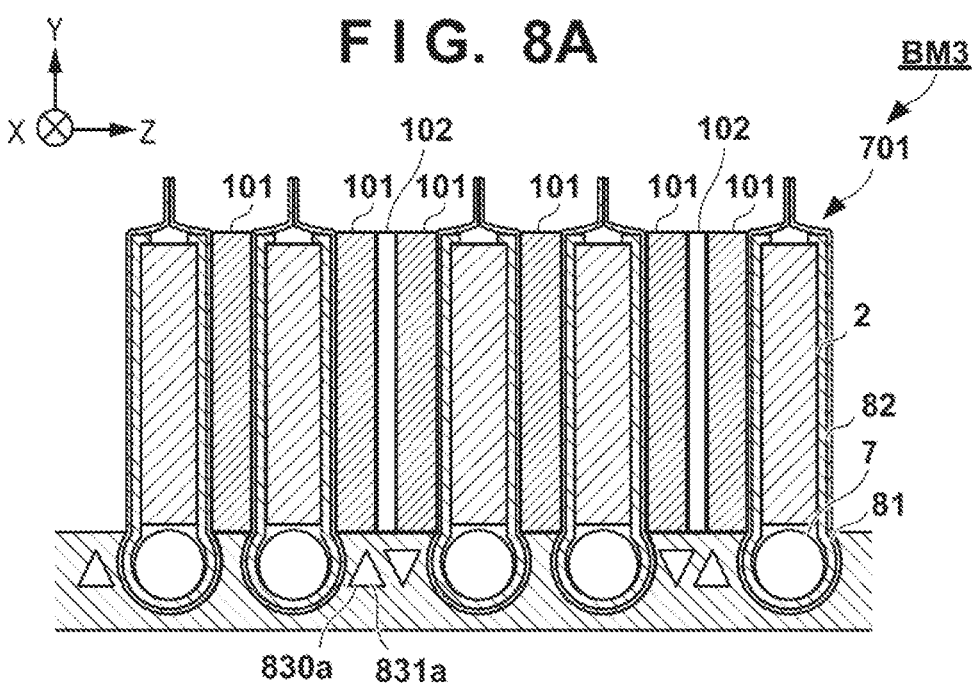
F I G. 8B
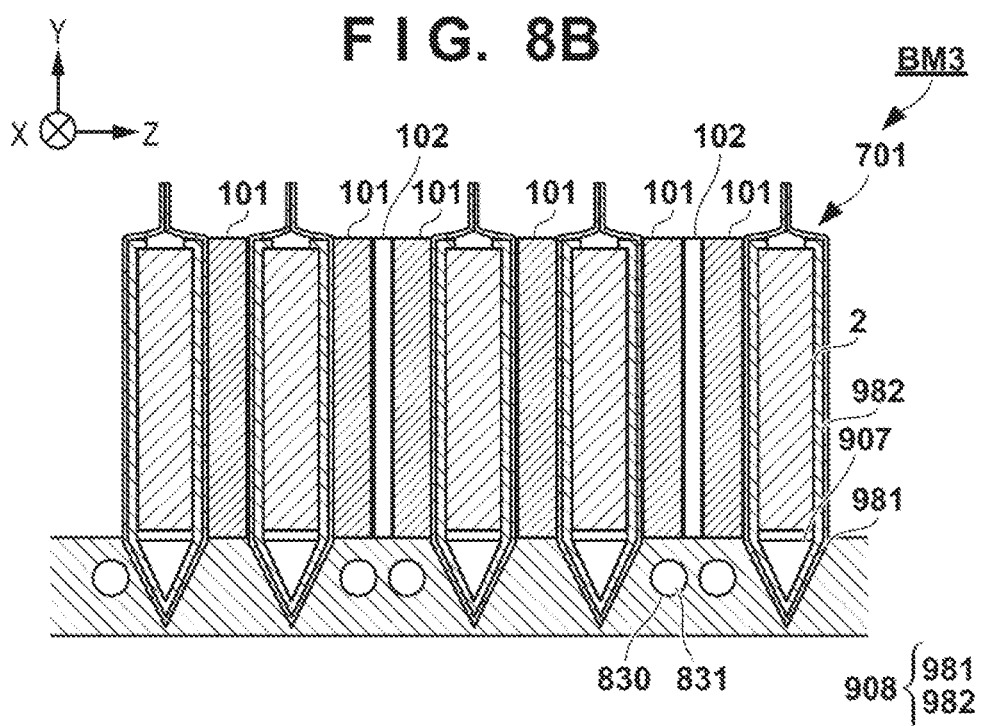

ALL-SOLID-STATE BATTERY AND BATTERY MODULE

CROSS-REFERENCE TO RELATED APPLICATION(S)

This application claims priority to and the benefit of Japanese Patent Application No. 2022-048399 filed on Mar. 24, 2022, the entire disclosure of which is incorporated herein by reference.

BACKGROUND OF THE INVENTION

Field of the Invention

The present invention relates to an all-solid-state battery and a battery module.

Description of the Related Art

From the viewpoint of climate-related disasters, electrification of industrial machines has been promoted in order to reduce CO2, and research on storage batteries as energy sources for the industrial machines has been conducted also for use in vehicles and the like. As one of the storage batteries, an all-solid-state battery, which is an entirely solid battery obtained using a solid electrolyte, is known. As the solid electrolyte, a sulfide-based solid electrolyte may be used from the viewpoint of high ion conductivity or the like. In a case where a sulfide-based solid electrolyte is used, there is a possibility that hydrogen sulfide gas is generated by reaction with moisture due to some trigger, and thus an all-solid-state battery having a hydrogen sulfide gas absorbent in a cell has been proposed in Japanese Patent Laid-Open No. 2011-124084.

However, it is considered that the hydrogen sulfide gas is discharged to the outside of the cell even in a case where the hydrogen sulfide gas absorbent or the like is provided in the cell. In such a case, constituent members of the all-solid-state battery and the like may be corroded depending on the position where the hydrogen sulfide gas is discharged.

SUMMARY OF THE INVENTION

The present invention provides a technology for discharging hydrogen sulfide gas to the outside of a cell of an all-solid-state battery at a desired position in a case where the hydrogen sulfide gas is generated in the cell.

According to an aspect of the present invention, there is provided an all-solid-state battery comprising: a laminated body in which a positive electrode layer, a sulfide-based solid electrolyte layer, and a negative electrode layer are laminated; an absorber configured to absorb hydrogen sulfide gas; and an outer package configured to form a housing space in which the laminated body and the absorber are housed, wherein the outer package includes a sealing portion configured to hermetically seal the housing space, the sealing portion includes a fragile portion whose sealing strength is weaker than that of the other portion of the sealing portion, and in a case where the hydrogen sulfide gas is generated in the housing space, sealing of the fragile portion is released earlier than the other portion to form a discharge port through which the hydrogen sulfide gas is discharged to an outside of the housing space.

Further features of the present invention will become apparent from the following description of exemplary embodiments (with reference to the attached drawings).

BRIEF DESCRIPTION OF THE DRAWINGS

FIG. 5A is a plan view schematically illustrating a configuration of a battery module including the all-solid-state battery;

FIG. 5B is a cross-sectional view taken along line C-C of FIG. 5A;

FIG. 7A is a plan view schematically illustrating a configuration of a battery module according to an embodiment;

FIG. 7B is a cross-sectional view taken along line E-E of FIG. 7A; and

FIGS. 8A and 8B are cross-sectional views taken along line E-E of FIG. 7A, and are views illustrating modifications of the battery module of FIG. 7A.

DESCRIPTION OF THE EMBODIMENTS

Figure 1A:
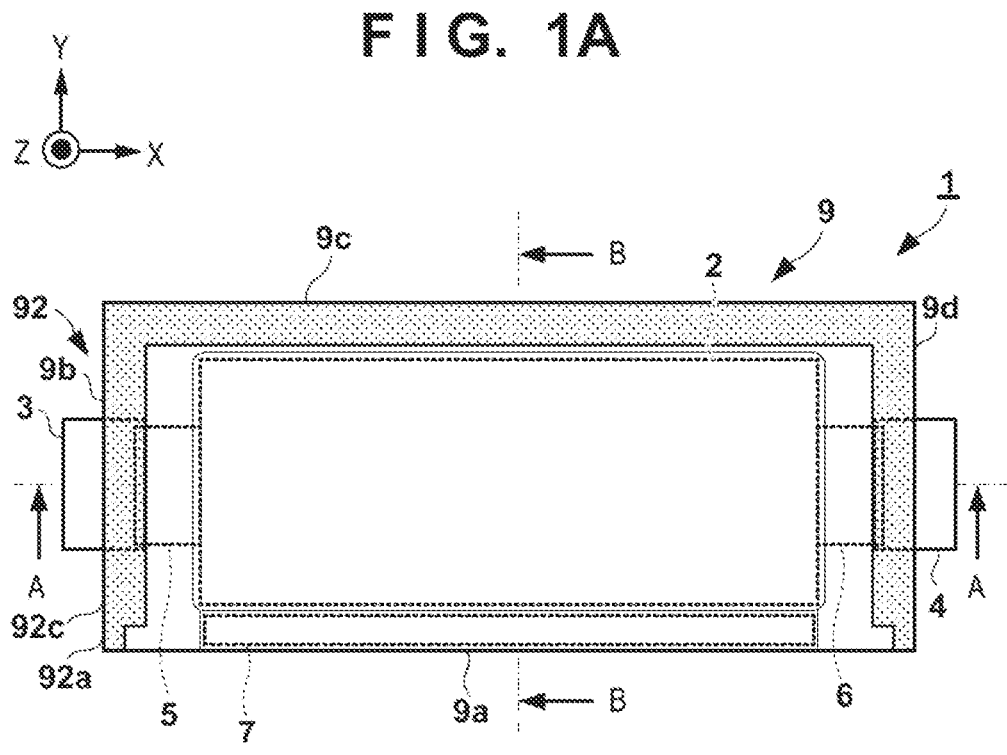
FIG. 1A is a front view of an all-solid-state battery according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Outline of All-Solid-State Battery 1>

Figure 1B:
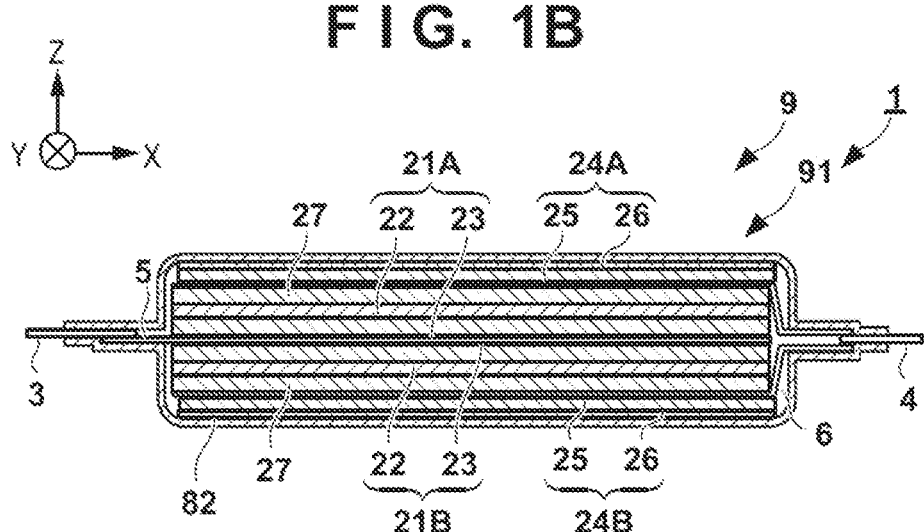
FIG. 1B is a cross-sectional view taken along line A-A of FIG. 1A.
Figure 2:
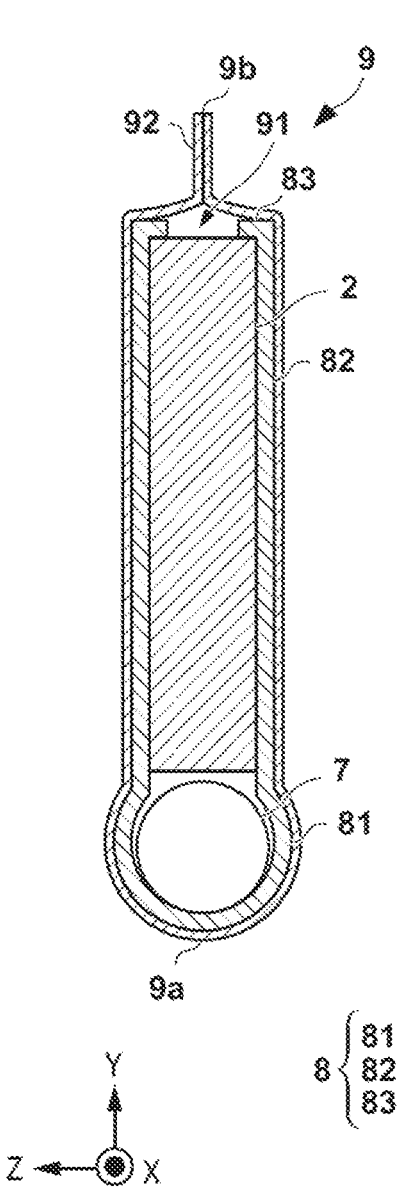
FIG. 2 is a cross-sectional view taken along line B-B of FIG. 1A.

FIG. 1A is a front view of an all-solid-state battery 1 according to an embodiment of the present invention, and FIG. 1B is a cross-sectional view taken along line A-A of FIG. 1A. FIG. 2 is a cross-sectional view taken along line B-B of FIG. 1A. In the drawings, an arrow X indicates a longitudinal direction of the all-solid-state battery 1 (or an extending direction of a lead tab), an arrow Y indicates a width direction of the all-solid-state battery 1 (or a direction orthogonal to the extending direction of the lead tab), and an arrow Z indicates a thickness direction of the all-solid-state battery 1 (a laminating direction of a laminated body 2), and an X direction, a Y direction, and a Z direction are orthogonal to each other. FIG. 1A is a view of the all-solid-state battery 1 as viewed in the Z direction. In addition, in each drawing, only some of a plurality of illustrated elements may be denoted by reference signs for ease of reference.

The all-solid-state battery 1 includes a laminated body 2 which is an energy storage element, lead tabs 3 and 4, current collecting tabs 5 and 6, an absorber 7, a support member 8, and an outer package 9, and has a form of a battery cell suitable for an assembled battery.

The laminated body 2 has a rectangular parallelepiped shape as a whole and includes two positive electrode layers 21A and 21B and two negative electrode layers 24A and 24B to have a structure in which each of the number of positive electrode layers and the number of negative electrode layers is two. However, in the laminated body 2, each of the number of positive electrode layers and the number of negative electrode layers may be one or three or more. Sulfide-based solid electrolyte layers 27 are provided between the positive electrode layer 21A and the negative electrode layer 24A and between the positive electrode layer 21B and the negative electrode layer 24B, respectively. That is, the laminated body 2 is formed by laminating the positive electrode layer, the sulfide-based solid electrolyte layer, and the negative electrode layer.

Each of the positive electrode layers 21A and 21B includes a positive electrode active material layer 22, and a positive electrode current collector 23 is shared between the two positive electrode layers 21A and 21B. The positive electrode current collector 23 is arranged in the form of a layer at the center of the laminated body 2 in the Z direction, and the respective positive electrode active material layers 22 are laminated on the front and back sides thereof.

The negative electrode layers 24A and 24B are arranged on one outer side and the other outer side in the Z direction with respect to the positive electrode layers 21A and 21B, respectively, and are laminated in such a way that the negative electrode layers 24A and 24B sandwich the positive electrode layers 21A and 21B. However, contrary to the configuration of the present embodiment, it is also possible to adopt a configuration in which two positive electrode layers and two negative electrode layers are laminated in such a way that the two positive electrode layers sandwich the two negative electrode layers. The negative electrode layers 24A and 24B each include a negative electrode active material layer 25 and a negative electrode current collector 26. The two negative electrode current collectors 26 are formed in the form of layers on the outermost layers of the laminated body 2, respectively.

Examples of an active material included in the positive electrode active material layer 22 include lithium cobalt oxide, lithium nickel oxide, lithium manganese oxide, and lithium metal phosphate. Examples of an active material included in the positive electrode active material layer 22 include a ternary positive active material (NMC) containing nickel, manganese, and cobalt as main components, and sulfides that can be used in lithium-sulfur batteries. Examples of an active material included in the negative electrode active material layer 25 include a lithium-based material and a silicon-based material. Examples of the lithium-based material include Li metal and Li alloy. Examples of the silicon-based material include Si and SiO. Other examples of the active material included in the negative electrode active material layer 25 include carbon materials such as graphite, soft carbon, and hard carbon, tin-based materials (Sn, SnO, or the like) and lithium titanate as materials that show a relatively large volume expansion.

The sulfide-based solid electrolyte layer 27 is made of, for example, a solid electrolyte having ion conductivity, and a sulfide-based solid electrolyte material is used. The positive electrode current collector 23 and the negative electrode current collector 26 are made of, for example, a metal foil such as aluminum, copper, or SUS, a metal sheet, or a metal plate. The positive electrode active material layer 22, the negative electrode active material layer 25, and the sulfide-based solid electrolyte layer 27 may be formed by bonding particles of substances constituting the positive electrode active material layer 22, the negative electrode active material layer 25, and the sulfide-based solid electrolyte layer 27 with an organic polymer compound-based binder.

The lead tabs 3 and 4 are connected to a charger or an electric load to charge or discharge the laminated body 2. One end portions of the lead tabs 3 and 4 are positioned outside the outer package 9, and the other end portions are positioned inside the outer package 9. Here, the inside of the outer package 9 refers to a space formed by a housing space 91 of the outer package 9 to be described later.

The other end portion of the lead tab 3 is connected to the positive electrode current collector 23 via a current collecting tab 5 inside the outer package 9, and the lead tab 3 forms a positive electrode tab. The lead tab 3 and the current collecting tab 5 are formed of, for example, a conductive metal foil, metal sheet, or metal plate. On the other hand, the other end portion of the lead tab 4 is connected to the negative electrode current collector 26 via a current collecting tab 6 inside the outer package 9, and the lead tab 4 forms a negative electrode tab. The lead tab 4 and the current collecting tab 6 are formed of, for example, a conductive metal foil, metal sheet, or metal plate.

The absorber 7 absorbs hydrogen sulfide gas. In the present embodiment, since the sulfide-based solid electrolyte layer 27 is used, hydrogen sulfide gas may be generated inside the outer package 9 (the housing space 91) due to some trigger such as an external impact applied to a battery module BM. As the absorber 7 absorbs the hydrogen sulfide gas in such a case, it is possible to suppress the hydrogen sulfide gas from staying in the housing space 91 and corroding the electrode tabs (the lead tabs 3 and 4 and the current collecting tabs 5 and 6) or the like.

In addition, the absorber 7 is arranged below the laminated body 2 in a vertical direction (Y direction) in a posture of the all-solid-state battery 1 during use, that is, a posture of the all-solid-state battery 1 during use in the battery module BM to be described later. As a result, the absorber 7 can effectively absorb hydrogen sulfide gas having a specific gravity larger than that of the atmosphere. In addition, the absorber 7 is arranged over a longitudinal direction of the laminated body 2 in plan view in the posture of the all-solid-state battery 1 during use. Therefore, a problem that the absorber 7 becomes difficult to absorb the hydrogen sulfide gas depending on a place where the hydrogen sulfide gas is generated is prevented.

As the absorber 7, for example, an absorber capable of physically or chemically absorbing the hydrogen sulfide gas can be used. Specific examples of the absorber that physically absorbs the hydrogen sulfide gas include an absorber capable of adsorbing a gas body such as zeolite, activated carbon, or silica gel. Specific examples of the absorber that chemically absorbs the hydrogen sulfide gas include alkali-containing substances such as hydroxides of Groups I and II of the periodic table such as NaOH, KOH, $Ca(OH)_2$, and $Mg(OH)_2$, Ag or Cu-based powder, and solutions of iron oxide, copper nitrate, and the like.

The support member 8 supports the absorber 7. The support member 8 is provided to extend in an intersecting direction (X direction) intersecting the laminating direction (Z direction) of the laminated body 2, and supports the absorber 7 similarly extending in the intersecting direction (X direction). The position of the absorber 7 in the outer package 9 is defined by the support member 8. The support member 8 includes an absorber support portion 81 and an extending portion 82. The support member 8 is also called a support plate. Here, the laminating direction (Z direction) of the laminated body 2 and the intersecting direction (X direction) which is a direction in which the absorber 7 extends are orthogonal to each other, but the intersecting direction is not limited to the direction orthogonal to the laminating direction. For example, the intersecting direction may be a direction intersecting the laminating direction (Z direction) and including a component of the X direction.

The absorber support portion 81 defines the position of the absorber 7 in the outer package 9. The absorber support portion 81 is provided to surround the absorber 7 from side portions to a lower portion as viewed in the X direction (as viewed in the direction of FIG. 2). On the other hand, the absorber support portion 81 supports the absorber 7 in such a way that an upper side of the absorber 7 is opened, thereby securing a path through which the hydrogen sulfide gas generated in the sulfide-based solid electrolyte layer 27 flows to the absorber 7.

Figure 3:
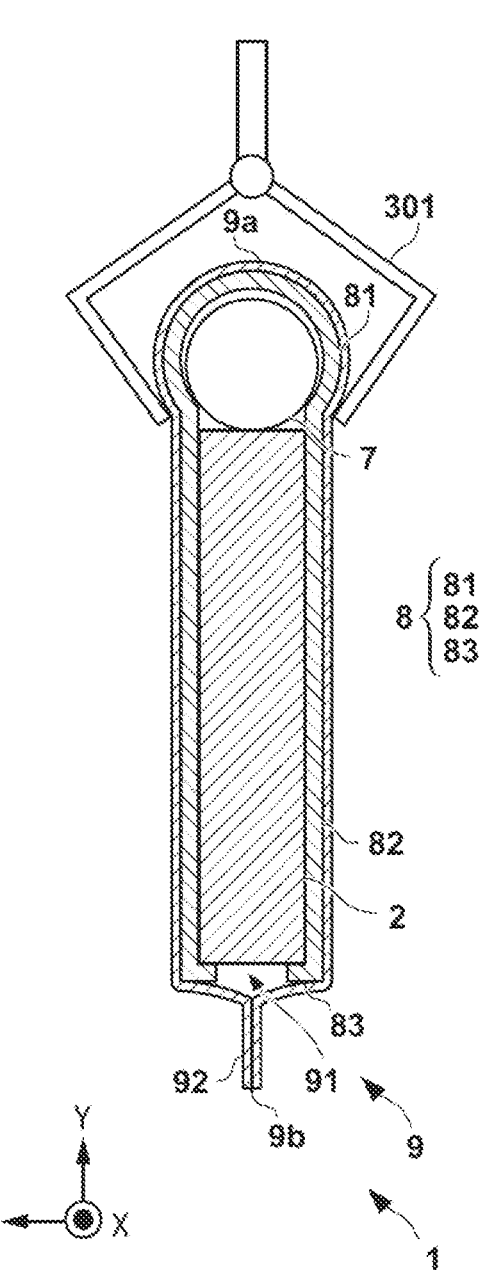
FIG. 3 is a view for explaining a state during transportation of the all-solid-state battery.

The absorber support portion 81 is formed to have a width larger than a thickness of the laminated body 2 in the laminating direction (Z direction) of the laminated body 2. As a result, the support member 8 can be gripped during transportation of the all-solid-state battery 1, and it is thus possible to suppress application of a load to the laminated body 2 during transportation. FIG. 3 is a view for explaining a state during transportation of the all-solid-state battery 1. For example, a gripping member 301 that grips the all-solid-state battery 1 can grip the all-solid-state battery 1 in such a way that a wide portion of the support member 8 is caught. In a case where such a wide portion does not exist, it is necessary to directly grip a portion corresponding to the laminated body 2 or to suck and hold a main surface of the laminated body 2. In the present embodiment, since a smaller load is not applied to the laminated body 2 as compared with these cases, it is possible to suppress the occurrence of damage, failure, and the like of the all-solid-state battery 1 during transportation.

The extending portion 82 is a portion extending upward from an upper portion of the absorber support portion 81 in the posture of the all-solid-state battery 1 during use. That is, the extending portion 82 is provided to extend between the laminated body 2 and the outer package 9. As a result, heat of the laminated body 2 is easily transferred to the extending portion 82, so that the heat of the laminated body 2 is effectively dissipated to the outside via the support member 8 when the battery module BM includes the all-solid-state battery 1 as described later.

In addition, the extending portion 82 extends to an upper side of the laminated body 2 in the posture of the all-solid-state battery 1 during use. The support member 8 includes a protruding portion 83 protruding inward in the laminating direction of the laminated body 2 to a portion on the upper side of the laminated body 2. The protruding portion 83 restricts the laminated body 2 from moving downward inside the outer package 9 when the all-solid-state battery 1 takes a posture during transportation as illustrated in FIG. 3, that is, a vertically inverted posture. That is, the protruding portion 83 can suppress positional displacement of the laminated body 2 inside the all-solid-state battery 1.

The outer package 9 constitutes a part of an appearance of the all-solid-state battery 1. The outer package 9 forms the housing space 91 that houses the laminated body 2 and the absorber 7. The outer package 9 is formed by folding a material of the outer package 9 in two. The material of the outer package 9 is formed by, for example, covering front and back surfaces of a metal layer with a resin layer (insulating layer). The outer package 9 formed of the material has flexibility for following expansion and contraction of the laminated body 2. The flexibility for following the expansion and contraction of the laminated body 2 can be obtained by characteristics of the material of the outer package 9 and the shape of the outer package 9.

The outer package 9 has a rectangular shape having four sides 9a to 9d when viewed in the Z direction. The side 9a is a side where the material of the outer package 9 is folded back. On the other hand, the sides 9b to 9d are sides where edges of the material of the outer package 9 overlap each other, and a sealing portion 92 is formed across the sides 9b to 9d.

The sealing portion 92 hermetically seals the housing space 91. In the present embodiment, the sealing portion 92 is formed by bonding the material of the outer package 9 by adhesion, welding, or the like. At the sides 9b and 9d facing each other among the three sides 9b to 9d, the lead tabs 3 and 4 are provided respectively in such a way as to cross the sealing portion 92. In the present embodiment, the sealing portion 92 includes a fragile portion 92a whose sealing strength is weaker than that of the other portion 92c of the sealing portion 92. In the present embodiment, the fragile portion 92a is formed at each of a portion of the side 9b that is adjacent to the side 9a and a portion of the side 9d that is adjacent to the side 9a. The fragile portion 92a will be described later.

Figure 4A:
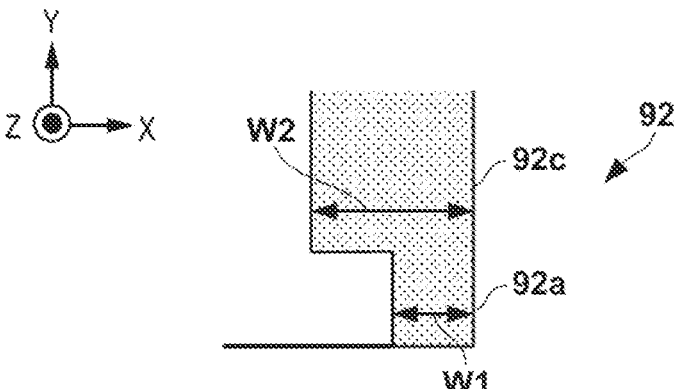
FIG. 4A is an enlarged view of a fragile portion.
Figure 4B:
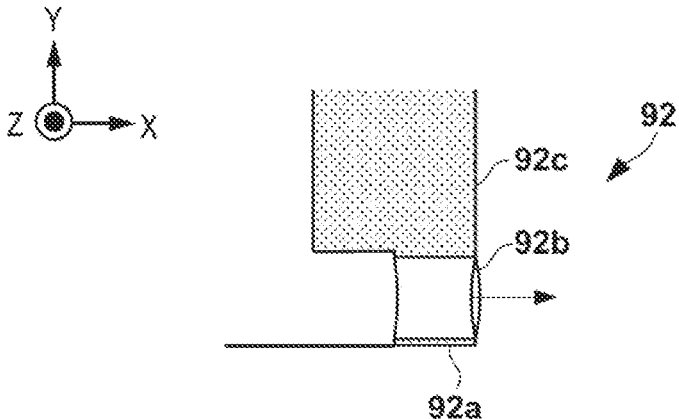
FIG. 4B is a view illustrating a state in which sealing is released in the fragile portion.

FIG. 4A is an enlarged view of the fragile portion 92a. FIG. 4B is a view illustrating a state in which sealing is released in the fragile portion 92a.

In a case where the hydrogen sulfide gas is generated in the housing space 91, sealing is released earlier at the fragile portion 92a than at the other portion 92c, thereby forming a discharge port 92b through which the hydrogen sulfide gas is discharged to the outside of the housing space 91. As a result, in a case where the hydrogen sulfide gas is generated inside the outer package 9 of the all-solid-state battery 1, the hydrogen sulfide gas can be discharged at a desired position.

Specifically, in the present embodiment, since the sulfide-based solid electrolyte layer 27 is used as a solid electrolyte layer, the hydrogen sulfide gas may be generated inside the outer package 9 (the housing space 91) due to some trigger. Here, the absorber 7 that absorbs the hydrogen sulfide gas is provided inside the outer package 9. However, for example, in a case where the hydrogen sulfide gas is not properly guided to the absorber 7 or the absorber 7 cannot absorb the generated hydrogen sulfide gas, the hydrogen sulfide gas may be discharged to the outside of the all-solid-state battery 1. In the present embodiment, since the discharge port 92b is formed in the fragile portion 92a whose position is set in advance in such a case, the hydrogen sulfide gas is discharged at the position set in advance. Therefore, it is possible to prevent the constituent members and the like of the all-solid-state battery 1 from being corroded by the hydrogen sulfide gas outside the all-solid-state battery 1.

In the present embodiment, the fragile portion 92a is arranged below the laminated body 2 in the vertical direction (Y direction) in the posture of the all-solid-state battery 1 during use, that is, the posture of the all-solid-state battery 1 during use in the battery module BM to be described later. As a result, the hydrogen sulfide gas having a specific gravity larger than that of the atmosphere can be effectively discharged from the discharge port 92b.

In the present embodiment, the sealing portion 92 hermetically seals the housing space 91 by overlapping and welding members forming the outer package 9. A width of a welding margin is smaller in the fragile portion 92a than in the other portion 92c of the sealing portion 92. As a result, a discharge direction of the hydrogen sulfide gas can be defined by a simple method. Specifically, a width W1 of the welding margin of the fragile portion 92*a* is smaller than a width W2 of the welding margin of the other portion 92*c* of the outer package 9. Therefore, the sealing strength of the fragile portion 92*a* is weaker than that of the other portion 92*c*, and thus, when the hydrogen sulfide gas stays in the housing space 91 and the pressure in the housing space 91 increases, the sealing is released first from the fragile portion 92*a*.

As a method of forming the fragile portion 92*a*, other methods such as changing a welding condition can be adopted in addition to a method of changing the width of the welding margin with respect to the other portion 92*c*. For example, in the fragile portion 92*a*, a temperature at the time of welding may be lower than that of the other portion 92*c*, a welding time may be shorter than that of the other portion 92*c*, or a pressure at the time of welding may be lower than that of the other portion 92*c*. Alternatively, the characteristics (for example, a melting point) of the resin layer of the material of the outer package 9 may be different between a portion corresponding to the fragile portion 92*a* and the other portion 92*c*.

Furthermore, the position and the number of the fragile portions 92*a* can be appropriately changed. Here, two fragile portions 92*a* are provided, but the number of fragile portions 92*a* may be one or three or more.

<Battery Module BM>

FIG. 5A is a plan view schematically illustrating a configuration of the battery module BM including the all-solid-state battery 1. FIG. 5B is a cross-sectional view taken along line C-C of FIG. 5A. The battery module BM is mounted on, for example, an electromotive vehicle such as a hybrid vehicle or an electric vehicle (EV) (not illustrated). The battery module BM includes a plurality of all-solid-state batteries 1 described above, a separator 101, and a base member 201.

The plurality of all-solid-state batteries 1 (battery cells) are stacked in the thickness direction (Z direction) to constitute a battery group. When the plurality of all-solid-state batteries 1 (battery cells) are stacked, the separator 101 having an insulating property can be arbitrarily arranged between the cells. For example, in the present embodiment, the all-solid-state batteries 1 and the separators 101 are alternately stacked in the Z direction in a state where the all-solid-state batteries 1 are arranged in an upright posture.

The base member 201 is a flat plate-shaped member that supports the all-solid-state battery 1, and is supported by a vehicle body frame, a bracket, or the like of the electromotive vehicle. The base member 201 includes an arrangement portion 210, a discharge path forming portion 220, and a refrigerant path forming portion 230.

The plurality of all-solid-state batteries 1 are arranged in the arrangement portion 210. Recesses 210*a* whose number corresponds to the number of all-solid-state batteries 1 are provided in the arrangement portion 210. Then, the all-solid-state batteries 1 are arranged in the arrangement portion 210 in a manner in which the all-solid-state batteries 1 are fitted into the recesses 210*a*. The recess 210*a* is formed in such a way that a wide portion (the absorber support portion 81) of the support member 8 of the all-solid-state battery 1 is fitted. As a result, when the battery module BM is subjected to an external force or vibration, the all-solid-state battery 1 is hardly detached from the arrangement portion 210. Therefore, a vibration resistance of the battery module BM can be improved. The arrangement portion 210 is formed of, for example, a flexible member, and the all-solid-state battery 1 is fitted into the recess 210*a* in a manner in which the all-solid-state battery 1 is pushed toward the recess 210*a* from above.

The discharge path forming portion 220 forms a discharge path 221 through which the hydrogen sulfide gas discharged from the discharge port 92*b* of the all-solid-state battery 1 arranged in the arrangement portion 210 passes. The discharge path forming portion 220 is, for example, a long hole formed in the base member 201.

The discharge path 221 is provided to extend in the Z direction on each of opposite sides of the arrangement portion 210 in the X direction. The discharge path 221 is provided in such a way as to overlap the fragile portion 92*a* of the all-solid-state battery 1 in the Y direction (vertical direction). The discharge path 221 is adjacent to the fragile portion 92*a* of the all-solid-state battery 1, and the hydrogen sulfide gas discharged from the discharge port 92*b* when the discharge port 92*b* is formed in the fragile portion 92*a* is introduced into the discharge path 221. The hydrogen sulfide gas introduced into the discharge path 221 is discharged to the outside of the battery module BM. As a result, it is possible to suppress the hydrogen sulfide gas from corroding the members and the like included in the battery module BM. For example, the battery module BM is arranged in an internal space of a battery pack. Then, the hydrogen sulfide gas discharged from the discharge port 92*b* is introduced into a space provided in advance in the battery pack and in which a hydrogen sulfide gas absorbent is arranged, via the discharge path 221. Alternatively, the hydrogen sulfide gas discharged from the discharge port 92*b* is introduced into a space provided independently of the battery pack and in which the hydrogen sulfide gas absorbent is arranged. As a result, other components (an auxiliary machine, a bus bar, and the like) provided in the battery pack may be suppressed from coming into contact with the hydrogen sulfide gas and being corroded. For this reason, it is possible to suppress the generated hydrogen sulfide gas from flowing into a passenger compartment where an occupant is present.

The refrigerant path forming portion 230 forms a refrigerant path 231 through which a refrigerant for cooling the all-solid-state battery 1 arranged in the arrangement portion 210 passes. The refrigerant path forming portion 230 is, for example, a long hole formed in the base member 201. The refrigerant path 231 is provided below the plurality of all-solid-state batteries 1 in such a way as to exist from one end to the other end of the all-solid-state battery 1 in the longitudinal direction while reciprocating in the Z direction. As a cooling structure of the battery module BM, for example, an air-cooling type cooling structure that introduces traveling wind during traveling of a vehicle can be adopted in addition to the cooling structure using the refrigerant.

With the battery module BM described above, when the hydrogen sulfide gas is generated inside the outer package 9 of the all-solid-state battery 1 included in the battery module BM, the hydrogen sulfide gas can be discharged at a desired position.

Second Embodiment

Figure 6A:
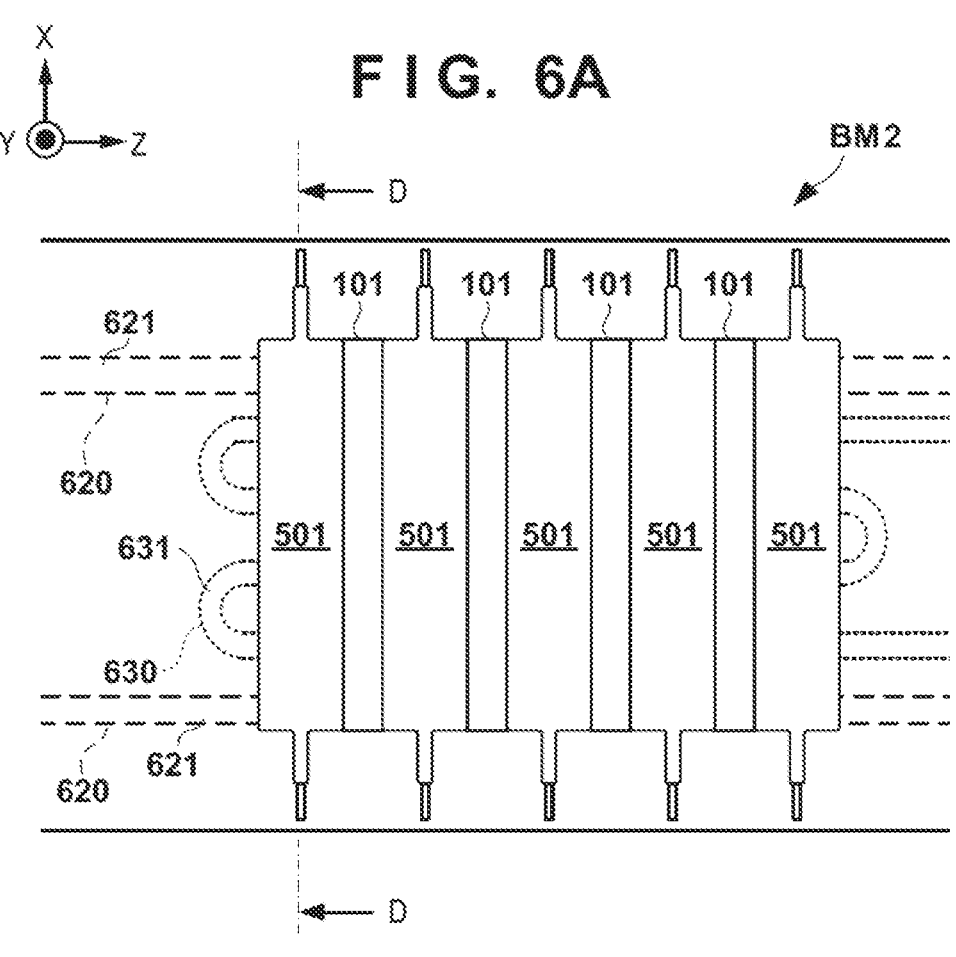
FIG. 6A is a plan view schematically illustrating a configuration of a battery module according to an embodiment.
Figure 6B:
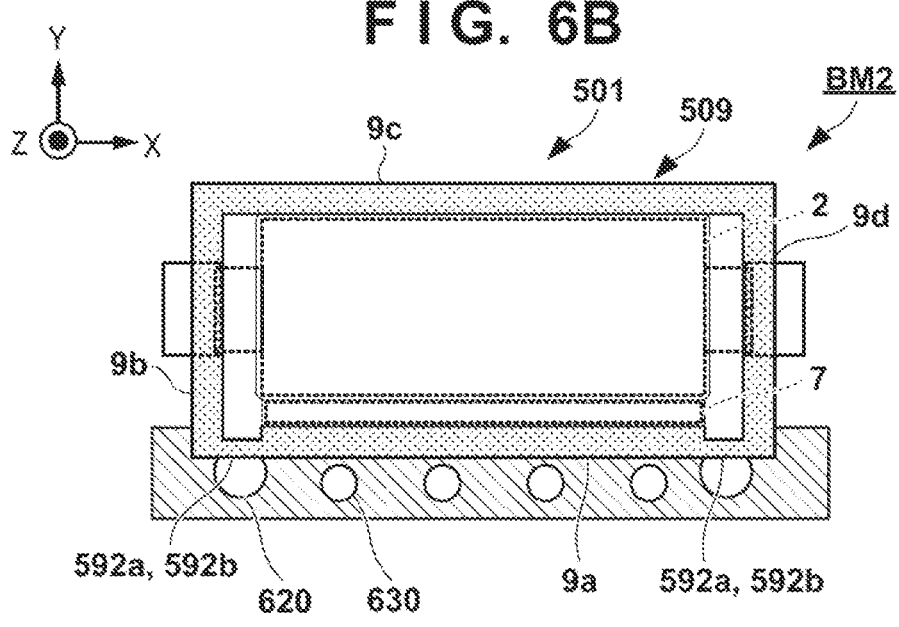
FIG. 6B is a cross-sectional view taken along line D-D of FIG. 6A.

FIG. 6A is a plan view schematically illustrating a configuration of a battery module BM2 according to an embodiment. FIG. 6B is a cross-sectional view taken along line D-D of FIG. 6A. Hereinafter, the same components as those of the battery module BM of the above-described embodiment are denoted by the same reference signs, and the descriptions thereof will be omitted.

In an all-solid-state battery 501 of the present embodiment, an outer package 509 is formed by overlapping two materials and sealing all of sides 9a to 9d. A fragile portion 592a is formed at the side 9a. A discharge port 592b formed by releasing sealing of the fragile portion 592a discharges the hydrogen sulfide gas downward. That is, the discharge port 592b is different from the discharge port 92b described above in the discharge direction of the hydrogen sulfide gas.

Two discharge paths 621 formed by discharge path forming portions 620 of a base member 201 extend in the Z direction below the all-solid-state battery 501 and are provided in such a way as to overlap with the fragile portions 592a on opposite sides in the X direction. As a result, when the discharge port 592b is formed in the fragile portion 592a, the hydrogen sulfide gas can be introduced into the discharge path 621. A refrigerant path 631 formed by a refrigerant path forming portion 630 of a base member 201 is provided in such a way as to exist between two discharge paths 621 in the X direction while reciprocating in the Z direction.

In the present embodiment, since the discharge path 621 is provided in such a way as to overlap the outer package 509 of the all-solid-state battery 501 in the X direction, the battery module BM2 can be downsized in the X direction. Here, the discharge path 621 entirely overlaps the outer package 509, but the discharge path 621 may partially overlap the outer package 509. In the present embodiment, since the discharge path 621 and the refrigerant path 631 are arranged in such a way as to overlap each other in the Y direction (vertical direction), the battery module BM2 can also be downsized in the Y direction.

Third Embodiment

FIG. 7A is a plan view schematically illustrating a configuration of a battery module BM3 according to an embodiment. FIG. 7B is a cross-sectional view taken along line E-E of FIG. 7A. Hereinafter, the same components as those of the battery module BM of the above-described embodiment are denoted by the same reference signs, and the descriptions thereof will be omitted.

In an all-solid-state battery 701 of the present embodiment, for example, a fragile portion 792a similar to the fragile portion 92a is formed only at a side 9b. A discharge port 792b formed by releasing sealing of the fragile portion 792a discharges the hydrogen sulfide gas in the X direction.

A discharge path 821 formed by a discharge path forming portion 820 of a base member 201 extends in the Z direction and is provided in such a way as to overlap the fragile portion 792a in the Y direction. As a result, when the discharge port 792b is formed in the fragile portion 792a, the hydrogen sulfide gas can be introduced into the discharge path 821.

A refrigerant path 831 formed by a refrigerant path forming portion 830 of the base member 201 includes a portion extending in the X direction. That is, the refrigerant path 831 is formed to extend in a direction in which a support member 8 of the all-solid-state battery 701 extends. The refrigerant path 831 has a portion extending along the support member 8 on at least one side in the Z direction with respect to each of a plurality of all-solid-state batteries 701. Accordingly, heat can be effectively transferred from a laminated body 2 to a refrigerant via the support member 8. A separator 101 or a cushion 102 may be added to a portion where an interval between the all-solid-state batteries 701 in the Z direction in order to secure a portion where the refrigerant path 831 extends along the support member 8.

In the present embodiment, both the discharge path 821 and the refrigerant path 831 overlap the all-solid-state battery 701 in the Y direction (vertical direction). Accordingly, the battery module BM3 can be downsized in the vertical direction. The discharge path 821 and the refrigerant path 831 may entirely overlap the all-solid-state battery 701 in the Y direction or partially overlap the all-solid-state battery 701 in the Y direction.

Modifications

FIGS. 8A and 8B are cross-sectional views taken along line E-E of FIG. 7A, and illustrate modifications of the battery module BM3. Note that the discharge path 821 is omitted here. In FIG. 8A, the refrigerant path 831a formed by the refrigerant path forming portion 830a has a triangular cross-sectional shape. As a result, the refrigerant path 831a can be arranged compactly in the Z direction, and the battery module BM3 can be downsized in the Z direction. In particular, the refrigerant path 831a can be arranged more compactly by vertically inverting the triangle of the cross section at a position to which a portion of the refrigerant path 831a extending along the support member 8 is adjacent in the illustrated direction. In FIG. 8B, an absorber 907 and an absorber support portion 981 of a support member 908 have an inverted triangular cross section in the illustrated direction. Also in such an aspect, since an all-solid-state battery 701 and the refrigerant path 831a can be brought close to each other in the Z direction, the battery module BM3 can be downsized in the Z direction.

Summary of Embodiments

The above-described embodiment discloses at least the following all-solid-state battery and battery module.

1. According to the embodiment, there is provided an all-solid-state battery (1) comprising:
   a laminated body (2) in which a positive electrode layer (21A, 21B), a sulfide-based solid electrolyte layer (27), and a negative electrode layer (24A, 24B) are laminated;
   an absorber (7) configured to absorb hydrogen sulfide gas; and
   an outer package (9) configured to form a housing space (91) in which the laminated body and the absorber are housed,
   wherein the outer package includes a sealing portion (92) configured to hermetically seal the housing space,
   the sealing portion (92) includes a fragile portion (92a) whose sealing strength is weaker than that of the other portion of the sealing portion, and
   in a case where the hydrogen sulfide gas is generated in the housing space, sealing of the fragile portion is released earlier than the other portion to form a discharge port (92b) through which the hydrogen sulfide gas is discharged to an outside of the housing space.

According to the embodiment, in a case where the hydrogen sulfide gas is generated inside the outer package of the all-solid-state battery, the hydrogen sulfide gas can be discharged at a desired position.

2. According to the embodiment, the absorber is arranged below the laminated body in a vertical direction in a posture of the all-solid-state battery during use.

According to the embodiment, the absorber can effectively absorb the hydrogen sulfide gas having a specific gravity larger than that of the atmosphere.

3. According to the embodiment, the fragile portion is arranged below the laminated body in a vertical direction in a posture of the all-solid-state battery during use.

According to the embodiment, it is possible to effectively discharge the hydrogen sulfide gas accumulated on the lower side in the housing space of the outer package.

4. According to the embodiment, the sealing portion hermetically seals the housing space by overlapping and welding materials of the outer package, and a width of a welding margin is smaller in the fragile portion than in the other portion.

According to the embodiment, a discharge direction of the hydrogen sulfide gas can be defined by a simple method.

5. According to the embodiment, the absorber is provided to extend in an intersecting direction intersecting a laminating direction of the laminated body, and the all-solid-state battery further comprises a support member (8) that extends in the intersecting direction between the absorber and the outer package and supports the absorber.

According to the embodiment, the position of the absorber in the outer package can be defined by the support member.

6. According to the embodiment, the support member is formed to have a width larger than a thickness of the laminated body in the laminating direction.

According to the embodiment, the support member can be gripped during transportation of the all-solid-state battery, and it is thus possible to suppress application of a load to the laminated body during transportation.

7. According to the embodiment, the support member is provided to extend between the laminated body and the outer package (82).

According to the embodiment, the heat generated in the laminated body can be dissipated to the outside via the support member.

8. According to the embodiment, the support member extends to an upper side of the laminated body in a vertical direction in a posture of the all-solid-state battery during use, and the support member includes a protruding portion (83) that protrudes inward in the laminating direction to a portion on the upper side of the laminated body.

According to the embodiment, even in a case where the all-solid-state battery is transported in a vertically inverted posture with respect to that during use, it is possible to suppress positional displacement of the laminated body inside the all-solid-state battery.

9. According to the embodiment, there is provided a battery module (BM) comprising:

an all-solid-state battery; and an arrangement portion in which the all-solid-state battery is arranged, wherein the all-solid-state battery includes:

a laminated body (2) in which a positive electrode layer (21A, 21B), a sulfide-based solid electrolyte layer, and a negative electrode layer (24A, 24B) are laminated;

an absorber (7) configured to absorb hydrogen sulfide gas; and an outer package (9) configured to form a housing space in which the laminated body and the absorber are housed, wherein the outer package includes a sealing portion (92) that hermetically seals the housing space, the sealing portion includes a fragile portion (92a) whose sealing strength is weaker than that of the other portion of the sealing portion, and in a case where the hydrogen sulfide gas is generated in the housing space, sealing of the fragile portion is released earlier than the other portion to form a discharge port (92b) through which the hydrogen sulfide gas is discharged to an outside of the housing space.

According to the embodiment, in a case where the hydrogen sulfide gas is generated inside the outer package of the all-solid-state battery included in the battery module, the hydrogen sulfide gas can be discharged at a desired position.

10. According to the embodiment, the absorber is provided to extend in an intersecting direction intersecting a laminating direction of the laminated body.

the all-solid-state battery further includes a support member (8) that extends in the intersecting direction between the absorber and the outer package and supports the absorber, the support member is formed to have a width larger than a thickness of the laminated body in the laminating direction, and the arrangement portion includes a recess (210a) into which a portion of the all-solid-state battery that includes the support member is fitted.

According to the embodiment, since a portion of the support member that is wider than the laminated body is fitted into the recess of the arrangement portion, the all-solid-state battery is hardly detached from the arrangement portion when being subjected to an external force or vibration. Therefore, a vibration resistance of the battery module can be improved.

11. According to the embodiment, the module further comprises a discharge path forming portion (220) configured to form a discharge path (221) through which the hydrogen sulfide gas discharged from the discharge port of the all-solid-state battery arranged in the arrangement portion passes.

According to the embodiment, since the hydrogen sulfide gas discharged from the discharge port can be discharged to the outside of the battery module, it is possible to suppress corrosion and the like of the members included in the battery module.

12. According to the embodiment, the module comprises a refrigerant path forming portion (230, 630, 830) configured to form a refrigerant path (231, 631, 831) through which a refrigerant for cooling the all-solid-state battery arranged in the arrangement portion passes, the absorber is provided to extend in an intersecting direction intersecting a laminating direction of the laminated body, the all-solid-state battery further includes a support member (8) that extends in the intersecting direction between the absorber and the outer package and supports the absorber, and the refrigerant path is formed to extend in a direction in which the support member extends (831).

According to the embodiment, the heat can be effectively transferred from the laminated body to the refrigerant via the support member.

13. According to the embodiment, the discharge path and the refrigerant path are arranged in such a way as to overlap each other in a vertical direction (621, 631, 821, 831).

According to the embodiment, the battery module can be downsized in the vertical direction.

While an embodiment has been described, the invention is not limited to the foregoing embodiments, and various variations/changes are possible within the spirit of the invention.

What is claimed is:

1. An all-solid-state battery comprising:
a laminated body in which a positive electrode layer, a sulfide-based solid electrolyte layer, and a negative electrode layer are laminated;
an absorber configured to absorb hydrogen sulfide gas; and
an outer package configured to form a housing space in which the laminated body and the absorber are housed,
wherein the outer package includes a sealing portion configured to hermetically seal the housing space,
the sealing portion includes a fragile portion whose sealing strength is weaker than that of the other portion of the sealing portion, and
in a case where the hydrogen sulfide gas is generated in the housing space, sealing of the fragile portion is released earlier than the other portion to form a discharge port through which the hydrogen sulfide gas is discharged to an outside of the housing space.

2. The all-solid-state battery according to claim 1,
wherein the absorber is arranged below the laminated body in a vertical direction in a posture of the all-solid-state battery during use.

3. The all-solid-state battery according to claim 1,
wherein the fragile portion is arranged below the laminated body in a vertical direction in a posture of the all-solid-state battery during use.

4. The all-solid-state battery according to claim 1,
wherein the sealing portion hermetically seals the housing space by overlapping and welding materials of the outer package, and
a width of a welding margin is smaller in the fragile portion than in the other portion.

5. The all-solid-state battery according to claim 1,
wherein the absorber is provided to extend in an intersecting direction intersecting a laminating direction of the laminated body, and
the all-solid-state battery further comprises a support member that extends in the intersecting direction between the absorber and the outer package and supports the absorber.

6. The all-solid-state battery according to claim 5,
wherein the support member is formed to have a width larger than a thickness of the laminated body in the laminating direction.

7. The all-solid-state battery according to claim 5,
wherein the support member is provided to extend between the laminated body and the outer package.

8. The all-solid-state battery according to claim 7,
wherein the support member extends to an upper side of the laminated body in a vertical direction in a posture of the all-solid-state battery during use, and
the support member includes a protruding portion that protrudes inward in the laminating direction to a portion on the upper side of the laminated body.

9. A battery module comprising:
an all-solid-state battery; and
an arrangement portion in which the all-solid-state battery is arranged, wherein the all-solid-state battery includes:
a laminated body in which a positive electrode layer, a sulfide-based solid electrolyte layer, and a negative electrode layer are laminated;
an absorber configured to absorb hydrogen sulfide gas; and
an outer package configured to form a housing space in which the laminated body and the absorber are housed,
wherein the outer package includes a sealing portion that hermetically seals the housing space,
the sealing portion includes a fragile portion whose sealing strength is weaker than that of the other portion of the sealing portion, and
in a case where the hydrogen sulfide gas is generated in the housing space, sealing of the fragile portion is released earlier than the other portion to form a discharge port through which the hydrogen sulfide gas is discharged to an outside of the housing space.

10. The battery module according to claim 9,
wherein the absorber is provided to extend in an intersecting direction intersecting a laminating direction of the laminated body,
the all-solid-state battery further includes a support member that extends in the intersecting direction between the absorber and the outer package and supports the absorber,
the support member is formed to have a width larger than a thickness of the laminated body in the laminating direction, and
the arrangement portion includes a recess into which a portion of the all-solid-state battery that includes the support member is fitted.

11. The battery module according to claim 9, further comprising
a discharge path forming portion configured to form a discharge path through which the hydrogen sulfide gas discharged from the discharge port of the all-solid-state battery arranged in the arrangement portion passes.

12. The battery module according to claim 11, further comprising
a refrigerant path forming portion configured to form a refrigerant path through which a refrigerant for cooling the all-solid-state battery arranged in the arrangement portion passes,
wherein the absorber is provided to extend in an intersecting direction intersecting a laminating direction of the laminated body,
the all-solid-state battery further includes a support member that extends in the intersecting direction between the absorber and the outer package and supports the absorber, and
the refrigerant path is formed to extend in a direction in which the support member extends.

13. The battery module according to claim 12,
wherein the discharge path and the refrigerant path are arranged in such a way as to overlap each other in a vertical direction.

* * * * *